C. O. PETTERSSON.
NOSE CLIP FOR EYEGLASSES.
APPLICATION FILED OCT. 21, 1912.
1,108,226.
Patented Aug. 25, 1914.
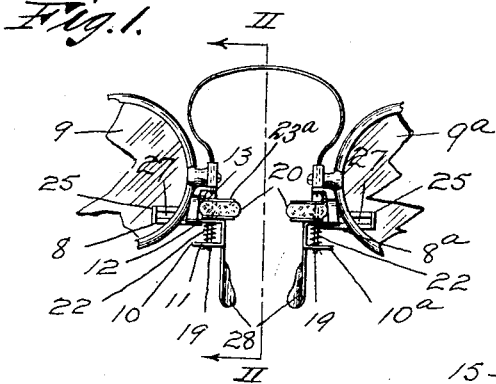
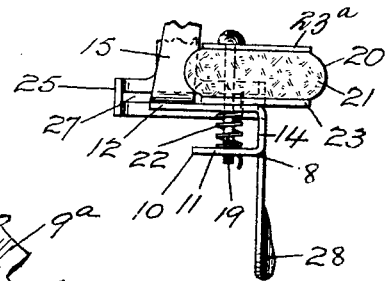
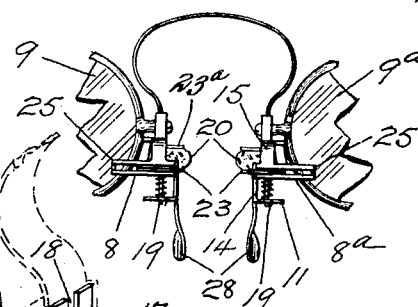
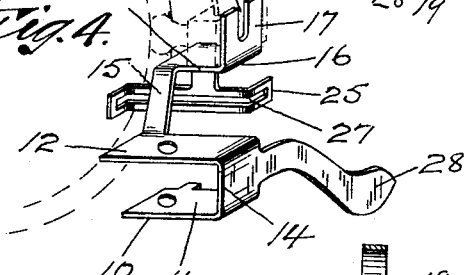
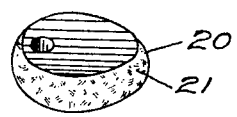
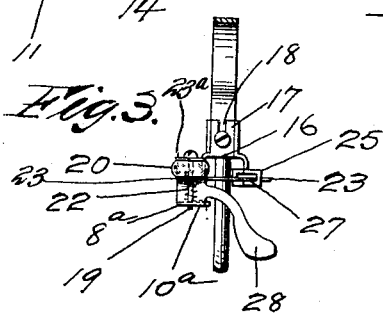
Witnesses:
Charles C. Abb
M. Demody
Inventor
Charles O. Pettersson
By his Attorney
H. T. Criswell

UNITED STATES PATENT OFFICE.

CHARLES O. PETTERSSON, OF NEW YORK, N. Y.

NOSE-CLIP FOR EYEGLASSES.

1,108,226.  Specification of Letters Patent.  Patented Aug. 25, 1914.

Application filed October 21, 1912.  Serial No. 726,967.

*To all whom it may concern:*

Be it known that I, CHARLES O. PETTERSSON, a subject of the King of England, and a resident of New York, county and State of New York, have invented a certain new and useful Improvement in Nose-Clips for Eyeglasses, of which the following is a full, clear, and exact specification.

This invention relates to a class of devices adapted to be used for supporting eyeglasses upon the nose of a person.

My invention has for its object primarily to provide a clip, or device designed to be employed for holding eyeglasses upon the nose of a person without causing excess of pressure upon the nerves especially between the eyes and which is of a construction whereby the glasses may be conveniently applied upon the nose and supported so as to be retained in accurate focus, thus overcoming the objections incident to forms of clips ordinarily in use.

Other objects of the invention are to provide a nose clip wherein two corresponding members are provided, and each member having an eccentrically pivoted gripping element mounted thereon in a manner so as to be adapted to be rotatably adjusted for yieldingly holding the clip and glasses upon the nose; to provide levers adapted to be laterally directed for conveniently adjusting the gripping members; to provide means which serve to permit the levers to be accurately guided; and to provide a form of clip which may be made in various sizes so as to be adapted for use upon different types of glasses.

With these and other objects in view the invention will be hereinafter more particularly described with reference to the accompanying drawing, which forms a part of this specification, and will then be pointed out in the claims at the end of the description.

In the drawing, Figure 1 is a rear view, partly fragmentary, of a pair of eyeglasses with one form of nose clip embodying my invention applied thereto. Fig. 2 is a front view, partly fragmentary, of the glasses and the nose clip. Fig. 3 is a section taken on the line II—II of Fig. 1. Fig. 4 is an enlarged perspective view of one of the brackets used in the nose clip. Fig. 5 is an enlarged side view of one of the members of the nose clip. Fig. 6 is an enlarged perspective view of one of the gripping elements used in the clip, and Fig. 7 is an enlarged perspective view of one of the levers used in conjunction with the gripping elements of the nose clip.

The nose clip, or device is composed of two members 8 and 8$^a$, each of which is adapted to be applied to one of the lenses 9 and 9$^a$ of the usual, or any preferred form of eyeglasses. Each of the members 8 and 8$^a$ has two supporting brackets 10 and 10$^a$ which are alike in size, and both of said brackets are preferably substantially S-shaped whereby each bracket is provided with spaced transversely disposed arms 11, 12, 13 and also integrally formed vertical arms 14 and 15. Upon the free ends of the arms 13 of each of the brackets 10 and 10$^a$ may be formed cross-strips, as 16, and projecting upwardly from each of the cross-strips are short fingers 17, each having a slot 18 in its free end which serve as means to permit the brackets to be removably secured by screws, or otherwise to the eyeglasses.

Through alined openings formed in the arms 11 and 12 of each of the supporting brackets 10 and 10$^a$ are rotatable pins 19, and each of said pins are of sufficient length to extend some distance above each of the arms 12. Held tightly to the pins 19 of each of the brackets are gripping elements, or rollers, or disks, as 20, adapted to engage the nose for holding the clip and eyeglasses thereon. Said disks are held between the plate 23 and the washer 23$^a$. Both of the disks 20 are preferably oval in shape, and are eccentrically mounted upon the pins 19 in a manner so that the corresponding narrow curved portions thereof are normally in opposed relation for providing nose seats, as 21.

In order, to permit the clip and eyeglasses to be frictionally but comfortably held upon the nose I prefer to make the disks 20 of felt, cork, rubber, or other material having more or less resilient properties, and encircling the pin 19 of each of the S-shaped brackets and between the arms 11 and 12 thereof is a spring 22. One end of each of the springs 22 is connected to each of the disks 20, and the opposite end of each of said springs is held upon the arm 11 of its respective bracket so that the springs 22 will normally serve to force the disks in directions for the seats 21 thereof to be oppositely spaced apart.

For the purpose of permitting the disks 20 to be manually rotated for swinging the seats 21 thereof in opposite directions whereby the space therebetween may be enlarged when the clip is applied upon the nose of a person, to the disks, and revoluble upon the pins 19 of each of the brackets 10 and 10ª, are rigidly held one end of each of two levers, as 23. Both of the levers 23 are disposed so as to extend transversely with respect to the seats 21 of the disks 20 and to the opposite face of the glasses when the clips are applied thereon, as illustrated. Each of the levers 23 may have a head, or bent end 24 upon its free end so as to be conveniently engaged by the fingers of a person for forcing the levers simultaneously in a lateral direction against the tension of the springs 22, and after the clip is directed so that the nose will be between the disks 20 by releasing the levers 23 the tension of the springs will then reversely rotate the disks so that the seats 21 thereof will yieldingly engage the nose for holding the glasses thereon.

Upon the cross-strip 16 of each of the arms 13 of the brackets, and opposite to the disks 20, are provided guides, as 25. The guides 25 are alike in formation, and each consists of a substantially rectangular curved plate. The plates are disposed on alinement longitudinally with respect to the brackets 10 and 10ª, and each of said plates has a lengthwise slot 27 through which one of the levers 23 is passed so as to be accurately guided when moved in opposite lateral directions. From the arms 14 of the brackets 10 and 10ª, and projecting in similar directions to the levers 23, are fingers 28. Both of the fingers 28 are disposed downwardly on corresponding inclines, and said fingers are spaced apart so that when the clip is applied upon the nose its bridge will be gripped therebetween.

In the foregoing description I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a nose clip for eyeglasses, two members, each having a bracket formed of spaced arms and each bracket being adapted to be removably fastened to one of the lenses of the glasses, two cushions, each eccentrically pivoted on one arm of one of the brackets so as to be in spaced opposed relation, means adapted to force the cushions toward each other, and two levers, each projecting from one of the cushions and adapted to be manually moved for swinging the cushions in opposite directions so as to engage the nose of a person when the clip is applied thereon.

2. In a nose clip for eyeglasses, two members, each having a bracket formed of spaced arms and each bracket being adapted to be removably fastened to one of the lenses of the glasses, two cushions, each eccentrically pivoted on one arm of one of the brackets so as to be in spaced opposed relation, means adapted to yieldingly force the cushions toward each other, and two levers, each projecting from one of the cushions and adapted to be manually moved for swinging the cushions in opposite directions so as to engage the nose of a person when the clip is applied thereon.

3. In a nose clip for eyeglasses, two members, each having a bracket formed of spaced arms and each bracket being adapted to be removably fastened to one of the lenses of the glasses, two cushions, each eccentrically mounted on one arm of one of the brackets so as to be in spaced opposed relation, two springs, each arranged between the arms of one of the brackets and normally serving to force the cushions toward each other, and two levers, each projecting from one of the cushions and adapted to be manually moved for swinging the cushions in opposite directions so as to engage the nose of a person when the clip is applied thereon.

4. In a nose clip for eyeglasses, two members, each having a bracket formed of spaced arms and each bracket being adapted to be removably fastened to one of the lenses of the glasses, two substantially oval-shaped resilient disks, each eccentrically pivoted on one arm of each of the brackets so that the corresponding narrow curved parts thereof are in spaced opposed relation, means adapted to force the disks yieldingly toward each other, and two levers, each projecting from one of the disks and adapted to be manually moved for swinging the disks in opposite directions so as to engage the nose of a person when the clip is applied thereon.

5. In a nose clip for eyeglasses, two members, each having a substantially S-shaped bracket and each bracket being adapted to be removably fastened to one of the lenses of the glasses, two resilient gripping elements, each eccentrically pivoted on one arm of each of the brackets so as to be in spaced opposed relation, two springs, each arranged between the other arms of each of the brackets and normally serving to force the disks toward each other, two levers, each projecting from one of the gripping elements and adapted to be manually moved for swinging said elements in opposite directions so as to engage the nose of a person when the clip is applied thereon, and two guides, each serving to guide the movement of each of the levers.

6. In a nose clip for eyeglasses, two members, each having a substantially S-shaped bracket and each bracket being adapted to be removably fastened to one of the lenses of the glasses, two substantially oval-shaped cushions, each eccentrically pivoted on one arm of each of the brackets so that the corresponding narrow-curved parts thereof are in spaced opposed relation, two springs, each arranged between the other arms of each of the brackets and normally serving to force the cushions toward each other, two levers, each projecting from one of the cushions and adapted to be manually moved for swinging the cushions in opposite directions so as to engage the nose of a person when the clip is applied thereon, and two guides, each serving to guide the movement of each of the levers.

This specification signed and witnessed this nineteenth day of October A. D. 1912.

CHARLES O. PETTERSSON.

Witnesses:
ROBT. B. ABBOTT,
ARTHUR SPENCER.

---

Copies of this patent may be obtained for five cents each, by addressing the "Commissioner of Patents, Washington, D. C."